United States Patent [19]

Shimasaki et al.

[11] Patent Number: 5,083,802
[45] Date of Patent: Jan. 28, 1992

[54] LIP SEAL DEVICE

[75] Inventors: Keiichi Shimasaki; Hiroshi Kanayama; Hiroshi Kanemitsu; Makoto Shibata; Satoshi Asahi; Akira Takenaka, all of Aichi, Japan

[73] Assignee: Taiho Kogyo Co., Ltd., Aichi, Japan

[21] Appl. No.: 657,264

[22] Filed: Feb. 19, 1991

Related U.S. Application Data

[63] Continuation of Ser. No. 330,028, Mar. 29, 1989, abandoned, which is a continuation of Ser. No. 196,694, May 20, 1988, abandoned.

[30] Foreign Application Priority Data

Jan. 11, 1988 [JP] Japan .................. 63-3504

[51] Int. Cl.$^5$ ............................................. F16J 15/32
[52] U.S. Cl. .................................... 277/152; 277/153; 277/215
[58] Field of Search ................ 277/134, 152, 153, 215

[56] References Cited

U.S. PATENT DOCUMENTS

| | | | |
|---|---|---|---|
| 2,329,028 | 9/1943 | Austin | 277/152 |
| 3,275,331 | 9/1966 | Mastrobattista et al. | 277/152 X |
| 3,801,114 | 4/1974 | Bentley | 277/134 |
| 3,938,813 | 2/1976 | Forch | 277/134 |
| 4,042,248 | 8/1977 | Williamitis | 277/152 X |
| 4,219,205 | 8/1980 | Christianson et al. | 277/152 X |
| 4,568,092 | 2/1986 | Hayashida | 277/152 |
| 4,623,153 | 11/1986 | Nagasawa | 277/153 |
| 4,755,115 | 7/1988 | Akaike | 277/152 |
| 4,834,397 | 5/1989 | Shimasaki et al. | 277/152 |

FOREIGN PATENT DOCUMENTS

| | | |
|---|---|---|
| 02305032 | 3/1986 | European Pat. Off. . |
| 876866 | 11/1941 | France ............. 277/152 |
| 0996711 | 6/1965 | United Kingdom . |

Primary Examiner—William A. Cuchlinski, Jr.
Assistant Examiner—Daniel G. DePumpo
Attorney, Agent, or Firm—Sughrue, Mion, Zinn Macpeak & Seas

[57] ABSTRACT

A lip seal device for sealing the gap between a housing and a rotary shaft comprises a case surrounding the rotary shaft, a lip seal attached inside the case a, support for holding the lip seal on the outer circumferential portion thereof and a seal located on the outside circumferential surface of the case. The inner circumferential portion of the lip seal is curved toward the sealed fluid. The lip seal includes a sealing surface provided with an annular groove extending continuously in the circumferential direction of the rotary shaft so that the sealing surface has a first and second sealing portion, the contact pressure of the first sealing portion on the rotary shaft being lower than the contact pressure of the second sealing portion on the rotary shaft.

9 Claims, 4 Drawing Sheets

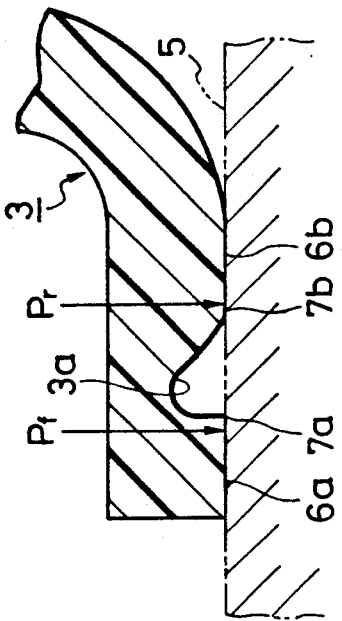
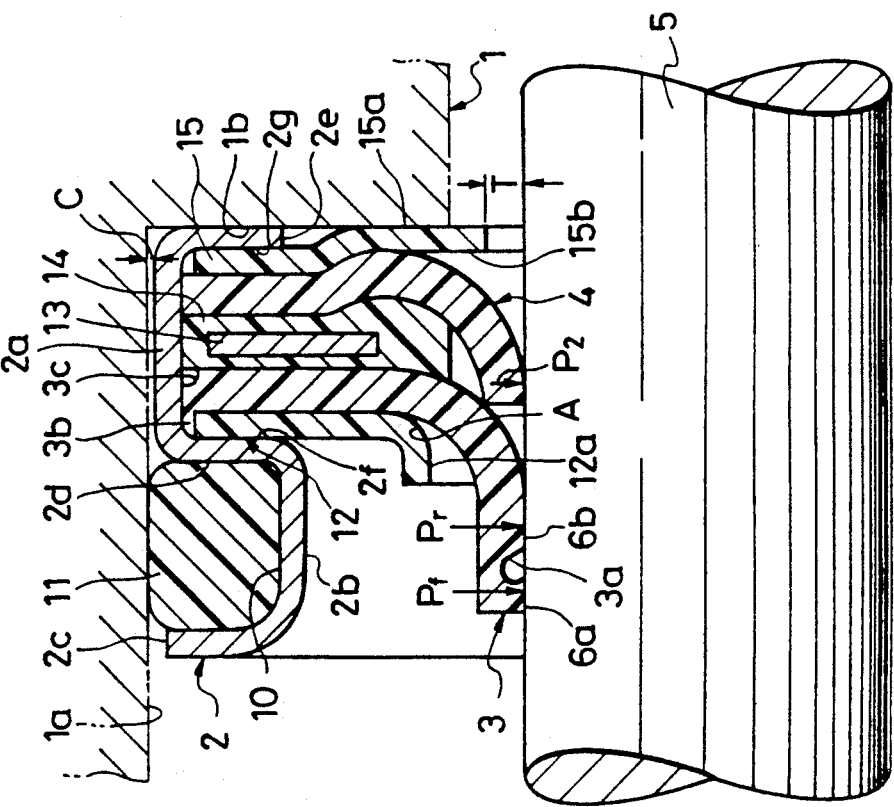

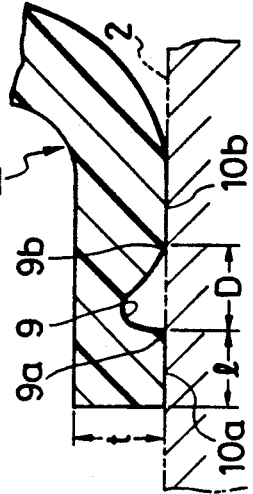
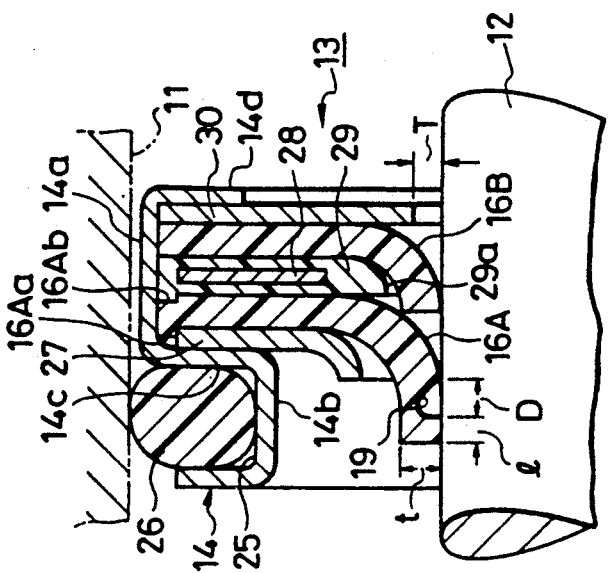
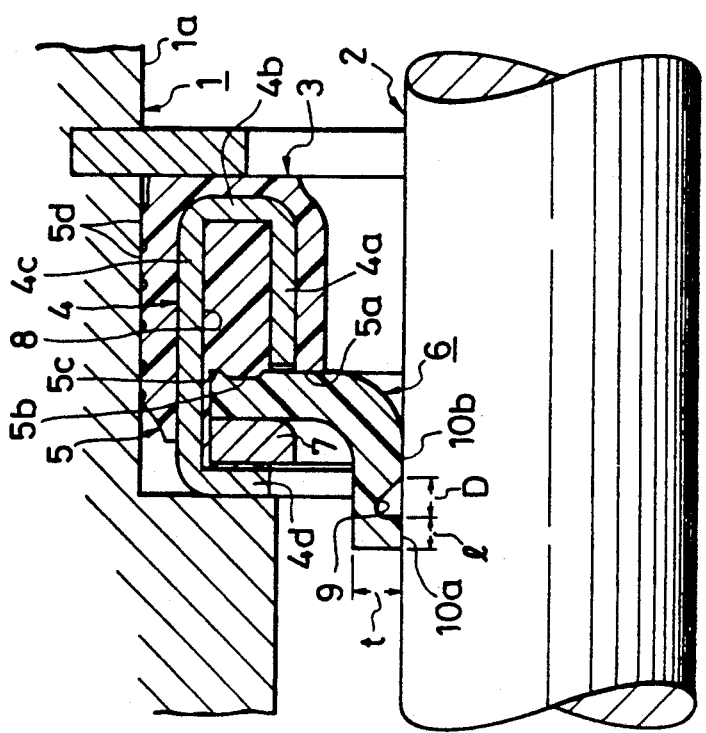

LIP SEAL DEVICE

This is a continuation of application No. 07/330,028, filed Nov. 29, 1991, now abandoned.

BACKGROUND OF THE INVENTION

The present invention relates to a lip seal device having a lip seal in sliding contact with a rotary shaft.

A lip seal device comprising a case surrounding a rotatably supported rotary shaft and a lip seal whose inner circumferential portion is curved toward a sealed fluid and is in sliding contact with the outside circumferential surface of the rotary shaft has been well known. A similar lip seal device having a lip seal whose sealing surface on a rotary shaft is provided with a spiral groove is disclosed in the U.S. Pat. Nos. 3,857,156 and 3,929,341. The sealing performance of the latter lip sealing device having a spiral groove is better during the rotation of the rotary shaft than that of the former lip seal device not having such a spiral groove. On the other hand, the sealing performance of the latter lip seal device having a spiral groove is much worse during the stoppage of the rotation of the rotary shaft than that of the former lip seal device not having a spiral groove.

Another lip seal device having a lip seal whose sealing surface on the rotary shaft include one or two annular grooves is disclosed in Kokai 55-30542. However, Kokai 55-30542 does not teach a contact force differential between the sealing surfaces on opposing sides of the annular groove. Accordingly, the sealing surface furthest from the pressurized fluid is not properly lubricated resulting in premature wearing of the sealing surface thereof.

SUMMARY OF THE INVENTION

The present invention was made in consideration of the above-mentioned circumstances.

Accordingly, it is an object of the present invention to provide a lip seal device in which the sealing surface of a lip seal on a rotary shaft is provided with an annular groove extending continuously in the circumferential direction of the rotary shaft; the contact force of the portion of the sealing surface in front of the annular groove on the rotary shaft being weaker than the contact force of the other portion of the sealing surface behind the annular groove on the rotary shaft.

It is another object of the present invention to provide a lip seal device in which the contact force of a second lip seal on a rotary shaft is set to be weaker than the contact force of a first lip seal on the rotary shaft.

Since the thickness of the lip seal of the lip seal device having the annular groove extending continuously in the circumferential direction of the rotary shaft is smaller at the annular groove than at the other portion of the lip seal, the portion having the annular groove is easier to be deformed by the pressure of a sealed fluid. Therefore the portion of the sealing surface of the lip seal at each side of the annular groove is in tighter contact with the outside circumferential surface of the rotary shaft. Since the annular groove extends continuously in the circumferential direction of the rotary shaft, the contact portions of the lip seal on the outside circumferential surface of the rotary shaft also extend continuously in the circumferential direction of the rotary shaft. As the two annular contact portions are obtained by providing the single annular groove, a double sealing effect is produced. For that reason, the sealing performance of the lip seal device is better than that of a conventional lip seal device both during the rotation of the rotary shaft and during the stoppage of the rotation.

Further, since the contact force of the portion of the sealing surface of the lip seal in front of the annular groove on the rotary shaft is weaker than that of the other portion of the sealing surface of the lip seal behind the annular groove on the rotary shaft the high sealing performance of the lip seal device can be maintained for a long period of time. If the contact force of the portion of the sealing surface of the lip seal in front of the annular groove on the rotary shaft, were substantially equal to or stronger than that of the other portion of the sealing surface of the lip seal behind the annular groove on the rotary shaft, a relatively good sealing effect would be produced by the front portion of the sealing surface. However, this would reduce the leaking of the sealed fluid to the rear portion of the sealing surface resulting in insufficient lubrication of the rear portion. The rear portion of the sealing surface would become deteriorated and thereby destroy the sealing function thereof. Therefore, only the front portion of the sealing surface would effectively seal the fluid. As a result, the above-mentioned double sealing effect would not be produced.

According to the subject invention, the contact force of the front portion of the sealing surface of the lip seal on the rotary shaft is weaker than that of the rear portion of the sealing surface on the rotary shaft. Thus, an appropriate quantity of the sealed fluid leaks along the front portion so as to be supplied to the rear portion and thereby prevent the wear of the rear portion to maintain the sealing function of the rear portion good for a long period of time. In addition, since the contact force of the rear portion of the sealing surface on the rotary shaft is stronger than that of the front portion of the sealing surface on the rotary shaft, the improved double sealing effect is maintained for a long period of time.

In the lip seal device wherein the contact force of the second lip seal on the rotary shaft is weaker than that of the first lip seal on the rotary shaft, a sufficient sealing function is provided by the second lip seal; the sliding contact resistance of the second lip seal to the rotation of the rotary shaft is lower than that in a conventional lip seal device; and the life of the second lip seal is longer than that of the conventional lip seal device.

DESCRIPTION OF THE DRAWINGS

FIG. 1 shows a sectional view of a lip seal device which is an embodiment of the present invention;

FIG. 2 shows an enlarged view of a major part of the lip seal device;

FIG. 3 shows a sectional view of another major part of the lip seal device;

FIG. 4 shows a sectional view of a lip seal device which is another embodiment of the present invention;

FIG. 5 shows an enlarged view of a major part of the lip seal device shown in FIG. 4;

FIG. 6 shows a sectional view of a lip seal device which is still another embodiment of the present invention;

DETAILED DESCRIPTION OF THE EXEMPLARY EMBODIMENTS

Figure 8:
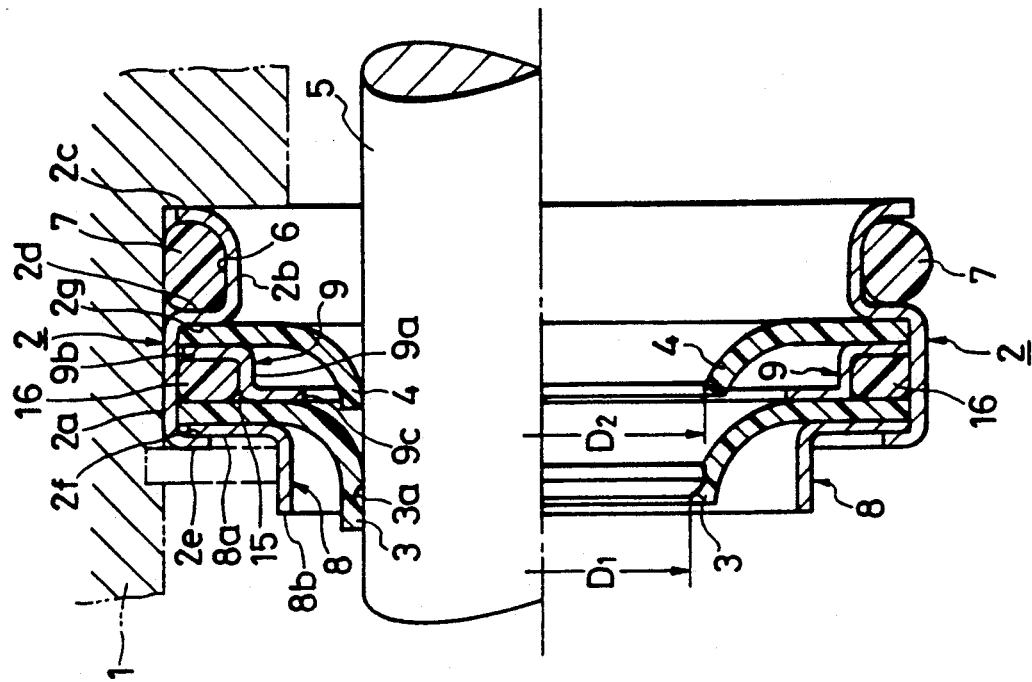
FIG. 8 shows a sectional view of a lip seal device which is still another embodiment of the present invention.

Embodiments of the present invention are hereafter described in detail with reference to the drawings attached hereto.

FIG. 1 shows a sectional view of a lip seal device which is one embodiment of the subject invention. The lip seal device comprises a cylindrical case 2 fitted in the hole 1a of a housing 1, and first lip seal 3 and second lip seal 4 whose outer circumferential portions are attached to the case. The inner circumferential portions of the first and second lip seals 3 and 4 are curved toward a sealed fluid, or leftward (as to FIG. 1), in the axial direction of a rotary shaft 5 extending through the case 2. Accordingly, the inner circumferential portions are put in sliding contact with the outside circumferential surface of the rotary shaft by the elasticity of the lip seals and the pressure of the sealed fluid to seal the outside circumferential surface of the rotary shaft.

The first lip seal 3, which is a left-hand lip seal (as to FIG. 1) located at the side of the sealed fluid, has an annular groove 3a provided in the sliding contact surface of the first lip seal and extending continuously in the circumferential direction of the rotary shaft. The sliding contact surface consists of a first sealing surface 6a, at the left (as to FIG. 1) of the annular groove, or in front of the annular groove, and a second sealing surface 6b at the right (as to FIG. 1) of the annular groove, or behind the annular groove. The cross section of the annular groove 3a is shaped as a semicircle slightly deformed toward the sealed fluid, as shown in FIG. 2. The corner of the joint 7a of the first sealing surface 6a and the annular groove 3a is made nearly rectangular so that the corner is as sharp as possible. The joint 7b of the second sealing surface 6b and the annular groove 3a is shaped as a smooth curved surface.

Figure 9:
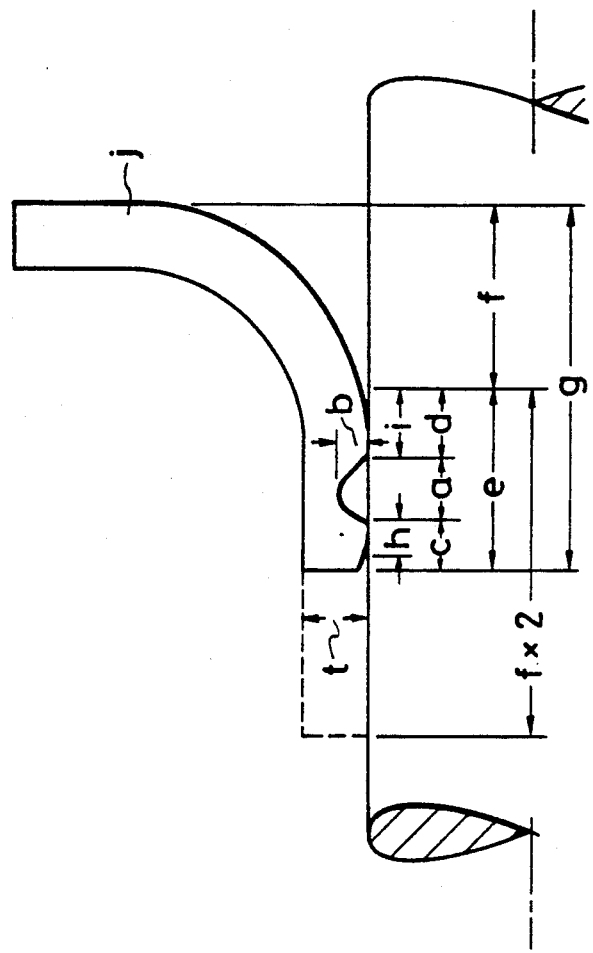
FIG. 9 shows a view of a major part of the lip seal device used for explaining an example of the present invention

A procedure, such as appropriately setting the width, depth and the position of the annular groove 3a, is followed so that the contact force Pf of the first sealing surface 6a on the rotary shaft 5 is set to be weaker than that Pr of the second sealing surface 6b on the rotary shaft. One example of setting the width, depth and the position of the annular groove 3a, etc. will be described referring to FIG. 9.

EXAMPLE

In the case where the lip seal 3 is 1 mm in thickness, a) the width (D) of the annular groove $3a = 0.7$ mm.

b) the depth of the groove = 0.35 mm.

c) the length (1) between the front end of the lip seal and the front end of the groove = 0.7 mm.

d) the length between the rear end of the lip seal and the real end of the lip contact surface = 1.0 mm.

e) the length between the front end of the lip seal and the rear end of the lip contact surface = 2.4 mm.

f) the length between the rear end of the lip contact surface and the rear end of the lip seal = 2.6 mm.

g) the length between the front end of the lip seal and the rear end of the lip seal = about 5 mm.

h) the length of the first sealing portion = 0.5 mm.

i) the length of the second sealing portion = 1.0 mm.

j) the material of the lip seal is fluoroplastics.

In this case, the ratio of the depth of the groove to the thickness t of the lip seal is 80 to 5%, preferably 60 to 10%, more preferably 50 to 20%, and most preferably 45 to 30%. In the above example, the ratio is set to 35%.

In the case where the thickness of the lip seal is set to be 1, the width of the groove is 0.1 to 1.6, preferably 0.2 to 1.2, more preferably 0.4 to 1.0, and most preferably 0.6 to 0.9. In the example, the width is set to be 0.7.

The curved portion extending from the rear end of the lip contact surface to the rear end of the lip seal contributes contact pressure to the second sealing portion. However, when the length to the front end of the lip seal is too long, no effective contact pressure is obtainable. For this reason, the length from the front end of the lip seal to the rear end of the lip contact surface is preferably set to be a value smaller than twice as long as the length from the rear end of the lip seal contact surface to the rear end of the lip seal. In the example, the former is set to be 0.9 times as long as the latter. Further, the length from the front end of the lip seal to the front end of the groove is different from that of the first sealing portion because the front end of the lip seal rises 0.2 mm.

The contact force $P_2$ of the second lip seal 4 on the rotary shaft 5 is set to be weaker than that Pf of the first sealing surface 6a on the rotary shaft, by making the inside diameter of the second lip seal larger than that of the first lip seal 3 in a free state before the lip seals are fitted on the rotary shaft.

The cylindrical case 2 has a large-diameter portion 2a and a small-diameter portion 2b. The outside diameter of the large-diameter 2a is set to be smaller by a prescribed quantity than the inside diameter of the housing 1 so that the case 2 can be loosely fitted with a prescribed clearance C in the hole 1a of the housing. The left-hand end (as to FIG. 1) of the small-diameter portion 2b is bent outwardly in the radial direction of the lip seal device so that a flange 2c is formed. An annular groove 10 is defined on the outside circumferential surface of the case 2 by the flange, the small-diameter portion 2b and a wall 2d located between the small-diameter portion 2b and the large-diameter portion 2a. A sealing member 11 made of an O-ring is fitted in the annular groove 10. The annular groove could be provided in the housing.

When the case 2 is fitted with the clearance C in the hole 1a of the housing 1, the sealing member 11 is press-fitted in the hole to fix the case in the housing so that the sealed fluid present at the left (as to FIG. 1) of the case is prevented from leaking rightwardly through the clearance C. At that time, the center line of the sealing member 11 and that of the annular groove 3a are located in a vertical plane perpendicularly intersecting the axis of the rotary shaft 5.

The right-hand end (as to FIG. 1) of the large-diameter portion 2a is bent inwardly in the radial direction of the lip seal device so that a crimped portion 2e is formed. Engaging surfaces 2f and 2g facing each other in the axial direction of the lip seal device are constituted by the wall 2d and the crimped portion 2e, respectively. Between the engaging surfaces 2f and 2g, a plate 12, the first lip seal 3 a sealing member 14 embedded with a rigid plate 13 such as a metal washer, the second lip seal 4 and a plate 15 are interposed in that order from the wall 2d and pinch-held together side by side in the axial direction of the lip seal device.

The plate 12 is made of a metal so that the outside diameter thereof is smaller by a prescribed quantity than the inside diameter of the large-diameter portion 2a. A projection 3b formed on the outside circumferential portion of the first lip seal 3 and extending toward the sealed fluid is engaged on the outside circumferential surface of the plate 12 to prevent the first lip seal from coming off. The inner circumferential portion of the plate 12 is curved toward the sealed fluid, or leftward (as to FIG. 1), in the axial direction of the seal lip device so that a cylindrical portion 12a is formed at the inner circumferential edge of the plate. If the inner circumferential portion of the plate 12 were only curved in the form of the truncated cone toward the sealed surface, the edge of the type of the truncated-cone-shaped portion of the plate would likely damage the first lip seal 3 at the time of assembly, conveyance or the like of the lip seal device. However, according to the subject invention since the cylindrical portion 12a is formed at the inner circumferential edge of the plate 12, the edge is prevented from damaging the first lip seal 3.

FIG. 3 shows the state of the sealing member 14 not yet disposed in the lip seal device. The sealing member 14 is made of an elastic material such as rubber so that an annular projection 14a extending outwardly in the radial direction of the lip seal device is formed on a part of the outside circumferential surface of the sealing member to surely seal the boundary between the case 2 and the sealing member. Both the sides of the sealing member 14 are provided with annular grooves 14b and 14c so that the annular grooves absorb the elastic deformation of the annular projection 14a when the sealing member is fitted in the case 2 and pinch-held by the engaging surfaces 2f and 2g.

The outer circumferential portion of the first lip seal 3 is provided with an annular groove 3c opposite the projection 3b so that the annular groove also absorbs the elastic deformation of the annular projection 14a of the sealing member 14 when the sealing member is fitted in the case 2 and pinch-held by the engaging surfaces 2f and 2g. The projection 3b and the annular groove 3c can be simultaneously made by deforming the outer circumferential portion of the first lip seal 3 through extrusion in the axial direction thereof.

The inside circumferential surface of the sealing member 14 is a curved surface 14d along the sealed-fluid-side curved surface of the second lip seal 4 so as to prevent the inner circumferential portion of the second lip seal from being displaced leftward (as to FIG. 1) more than a necessary quantity. The inner circumferential edge of the second lip seal 4 contacts the first lip seal 3 to support the first lip seal.

The plate 15, located at the end of the case 2 opposite the sealed fluid, is made of a metal and shaped as a dish so that the central portion of the plate is provided with a projection 15a extending rightwardly (as to FIG. 1) and a recess 15b having a prescribed form is provided on the central portion opposite the projection, to increase the rigidity of the plate. The right-hand side of the projection 15a and that of the crimped portion 2e of the case 2 are located in the same plane and simultaneously put in contact with the wall surface 1b of the housing 1. The gap T between the inside circumferential surface of the plate 15 and the outside circumferential surface of the rotary shaft 5 is set to be so small as to prevent the inner circumferential portion of the second lip seal 4 from accidentally being turned back rightward (as to FIG. 1).

The plate 15 may be made of a flat metal sheet wherein the recess is formed by the pressure exerted on the plate by the crimping of the crimped portion 2e. In this manner, the right side (as to FIG. 1) of the plate can be located in the same plane as that of the caulked portion 2e of the case.

When the plate 12, the first lip seal 3, the sealing member 14, the second lip seal 4 and the plate 15 are pinch-held by the engaging surfaces 2f and 2g, the outer circumferential portion of the sealing member 14 made of the elastic material such as rubber is deformed inwardly in the radial direction of the lip seal device to expand the inner circumferential portion of the sealing member and thereby push and deform the lip seals 3 and 4 in the axial direction of the lip seal device. Since the plate 12, located at the side of the sealed fluid, has the cylindrical portion 12a near the axis of the plate, the rigidity of the plate is high so that the inner circumferential portion of the sealing member 14 is expanded in the direction opposing the sealed fluid. If the plate 15 located at the end of the case 2 opposite the sealed fluid were simply shaped as a flat sheet, the central portion of the plate would be conically protruding due to the expansion of the inner circumferential portion of the sealing member 14 through the action of the second lip seal 4.

Since the degree of the protrusion of the central portion of the plate 15 would vary from device to device, the conditions on the contact of the second lip seal and the rotary shaft 5 would fluctuate resulting in inconsistent contact of the rotary shaft 5 and the first lip seal 3 located in contact with the second lip seal, to deteriorate the sealing performance of the lip seal device.

According to the subject invention, the central portion of the plate 15 has the projection 15a extending in the direction reverse to the sealed fluid and has the recess 15b having the prescribed form and located opposite the projection. Therefore the rigidity of the plate is increased and the elastic deformation of the sealing member 14 is restricted to a substantially constant quantity. As a result, the conditions on the contact of the rotary shaft 5 and the lip seals 3 and 4 are restricted to substantially constant levels so that a constant and sure sealing effect is provided.

The right-hand side of the projection 15a of the plate 15 and the crimped portion 2e of the case 2 simultaneously contact the wall surface 1b of the housing 1, as mentioned above. Therefore, although the case 2 is fitted with the prescribed clearance C in the hole 1a of the housing 1, the case is fixed more stably than that of a lip seal device in which only the right-hand side of the crimped portion of the case contacts the wall surface of the housing.

Since the sealing surface of the first lip seal 3 is provided with the annular groove 3a, the thickness of the portion of the first lip seal at the annular groove is reduced to make the portion easier to deform by the pressure of the sealed fluid. For that reason, both the joints 7a and 7b of the annular groove 3a have higher pressure contact with the outside circumferential surface of the rotary shaft 5. Therefore, the contact portion of joints 7a and 7b on the outside circumferential surface of the rotary shaft are in the shape of a line and belt, respectively extending continuously in the circumferential direction of the rotary shaft. The two annular contact parts are thus obtained by providing the single annular groove 3a, to produce a double sealing effect.

When the rotary shaft 5 is rotated, the front part of the first sealing surface 6a tends to slightly separate outwardly from the outside circumferential surface of the rotary shaft 5 because the contact force Pf of the first sealing surface on the rotary shaft is set to be relatively weak. If the joint 7a were shaped as a smooth curved surface, the line of contact between the contact portion of joint 7a and the rotary shaft extending circumferentially therearound is more likely to fluctuate in the axial direction of the rotary shaft. Thus, the line of contact would tend to resemble a "warped" circle, rather than a "pure" circle. Therefore, the con act portion would be more likely to become discontinuous in the circumferential direction of the rotary shaft resulting in excess leakage.

However, according to the subject invention, since the corner of the joint 7a is as sharp as possible and in contact with the outside circumferential surface of the rotary shaft 5, the positions of the circumferential contact portion of the joint 7a is less likely to fluctuate along the axial length of the shaft. Therefore, the contact portion of the joint 7a maintains a continuous line of contact along the circumference of the rotary shaft 5 to suppress the leakage of the sealed fluid. In other words, the quantity of the sealed fluid which leaks into the annular groove 3a along the first sealing surface 6a can be appropriately regulated in terms of the magnitude of the contact force Pf of the first sealing surface 6a and the sharpness of the corner of the joint 7a.

If the corner of the joint 7b located behind the other joint 7a were sharp, it would be desirable from a viewpoint of the prevention of leakage of the sealed fluid. However, the effect of lubrication by the sealed fluid would be reduced thereby resulting in premature deterioration of the second sealing surface 6b. For that reason, the joint 7b is shaped as a smooth curved surface to introduce the sealed fluid as a lubricant to the second sealing surface 6b to lubricate it well.

Since the contact force Pf of the first sealing surface 6a on the rotary shaft 5 is weaker than that Pr of the second sealing surface 6b on the rotary shaft an appropriate quantity of the sealing fluid is allowed to leak along the first sealing surface so as to supply the second sealing surface with lubricating fluid. As a result, the wear of the second sealing surface 6b is prevented to thereby maintain an affective sealing action for a long period of time. Since the contact force Pr of the second sealing surface 6b on the rotary shaft 5 is relatively strong, the sealing action of the second sealing surface is sufficient for a long period of time. As a result, the above-mentioned high double sealing effect is maintained for a long period of time. As very little sealed fluid is supplied as lubricant to the second lip seal 4, the contact force $P_2$ of the second lip seal on the rotary shaft 5 is the weakest so as to prevent the second lip seal from being worn.

Although the cross section of the annular groove 3a is shaped as the semicircle slightly deformed toward the sealed fluid, in the above-described embodiment, the present invention is not confined thereto but may be otherwise embodied so that the cross section of the annular groove is shaped as a simple semicircle, a semicircle slightly deformed in the direction reverse to the sealed fluid, or the like.

The center line of the sealing member 11 and that of the annular groove 3a of the first lip seal are located in the vertical plane perpendicularly intersecting the axis of the rotary shaft 5. Therefore, the case 2 is prevented form being swung during the rotation of the rotary shaft 5. When the rotary shaft 5 is being rotated, the large-diameter portion 2a of the case 2 supporting the lip seals 3 and 4 at the outer circumferential portions thereof is displaced in the radial direction of the lip seal device due to the whirl, deflection or the like of the rotary shaft. If the annular groove 10 and the sealing member 11 were located at the right-hand side (as to FIG. 1) of the large-diameter portion 2a of the case 2, the case would be swung and tilted about the sealing member due to the whirl, deflection or the like of the rotary shaft 5 at the time of the rotation thereof. Therefore the lip seals 3 and 4 would become misaligned thereby displacing the positions of the contact portions of the sealing surfaces 6a and 6b in the axial direction of the rotary shaft. As a result, the contact portions of the sealing surfaces 6a and 6b would become likely to extend discontinuous in the circumferential direction of the rotary shaft 5 to deteriorate the sealing performance of the lip seal device.

However, according to the subject invention, since the center line of the sealing member 11 and that of the annular groove 3a of the first lip seal 3 are located in the vertical plane perpendicularly intersecting the axis of the rotary shaft 5, the swing and tilt of the case 2 are prevented even if the case is displaced in the radial direction of the rotary shaft due to the whirl, deflection or the like thereof. The misalignment of the lip seals 3 and 4 is thus prevented to thereby maintain the contact portions of the sealing surfaces 6a and 6b continuous in the circumferential direction of the rotary shaft 5, to prevent the deterioration of the sealing performance of the lip seal device.

However, the center line of the sealing member 11 and that of the annular groove 3a of the first lip seal 3 do not need to be exactly located in the vertical plane perpendicularly intersecting the axis of the rotary shaft 5. What is necessary in that respect is that the contact surfaces of the sealing member 11 and the housing 1 or those of the sealing member 11 and the case 2, and the contact surfaces of the rotary shaft 5 and the sealing surfaces 6a and 6b of the first lip seal 3, having the strong contact force on the rotary shaft, are partially overlapped with each other in the axial direction of the rotary shaft.

FIG. 4 shows a lip seal device which is another embodiment and has only one lip seal 6. The contact force Pf of a first sealing surface 10a in front of the annular groove 9 of the lip seal 6, on the rotary shaft 5, is set to be weaker than that Pr of a second sealing surface 10b behind the annular groove, on the rotary shaft. A rotary shaft 2 is rotatably supported and extends through the stepped hole 1a of a housing 1. The lip seal device 3 seals the gap between the inside circumferential surface of the housing 1 and the outside circumferential surface of the rotary shaft 2. The lip seal device 3 comprises four members including a case 4 made of a metal, a sealing member 5 made of rubber or synthetic resin, the lip seal 6 made of rubber or synthetic resin, and a spacer 7 made of a metal.

The case 4 is annular shaped so that it surrounds the rotary shaft 2. The cross section of the case 4 comprises an inner axial portion 4a located in an inner position and extending in the axial direction of the case a first radial portion 4b extending outwardly from the right-hand end (as to FIG. 4) of the inner axial portion in the radial direction of the case, an outer axial portion 4c extending from the radial outer end of the first radial portion in parallel with the inner axial outside it, and a second radial portion 4d extending inwardly from the left-hand end (as to FIG. of the outer axial portion in the radial direction. The cross section of the case is shaped nearly as a rectangular ring cut at the radially inner left-hand corner thereof.

Before the lip seal 6 and the spacer 7 are assembled in the lip seal device 3, the outer axial portion 4c and second radial portion 4d of the case extend in the same axial direction as each other. After the lip seal and the spacer 7 are assembled in the lip seal device 3, the second radial portion 4d of the case 4 is bent inwardly the radial direction thereof so that the case is shaped nearly as the rectangular ring cut at the radially inner left-hand corner thereof.

The sealing member 5 is integrally attached to the case 4 by vulcanization or adhesion, and covers the outside circumferential surface of the outer axial portion 4c, the side surface of the first radial portion 4b and the inside circumferential surface of the inner axial portion 4a continuously. The sealing member 5 fills a case opening 8 surrounded by the inner axial portion 4a, the first radial portion 4b and the outer axial portion 4c, and continuously covers the inside circumferential surface of the outer axial portion 4c and the inside surface of the second axial portion 4d. The left-hand end of the portion of the sealing member 5, which fills the case opening 8, constitutes a support surface 5a. The outer circumferential portion of the lip seal 6 is pinch-held at both the sides thereof by the support surface 5a and the spacer 7 in such a manner that the outer circumferential portion is oriented in the radial direction of the lip seal device 3. The spacer 7 is supported at the left-hand side thereof by the second radial portion 4d bent inwardly in the radial direction of the lip seal device 3.

A part of the support surface 5a supporting the lip seal 6 is provided with a projection 5b extending toward the lip seal 6 outside the inner axial portion 4a of the case 4 with regard to the radial direction of the lip seal device 3 and continuing in the circumferential direction of the device. The support surface is also provided with an annular groove 5c adjacent to the projection and located outside thereto with regard to the radial direction of the device. When the outer circumferential portion of the lip seal 6 is pinch-held by the support surface 5a and the spacer 7, the projection 5b of the sealing member 5 is smoothly and elastically deformed more than the other portion of the support surface 5a while being displaced into the annular groove 5c. For that reason, even if the elasticity of the sealing member 5 decreases due to the aging thereof, the contact of the projection 5b and the lip seal 6 is kept sufficient to prevent the sealed fluid from leaking between the spacer 7 and the left-hand side of the lip seal 6 and between the right-hand side of the lip seal and the support surface 5a of the sealing member for a long period of time.

The lip seal 6 is pinch-held by the spacer 7 and the left-hand side of the inner axial portion 4a of the case 4 inside the projection 5b of the sealing member 5 with regard to the radial direction of the lip seal device 3. Therefore, the pinch-holding is maintained in prescribed state even if the sealing member ages. For that reason, the pinch-holding force on the lip seal 6 is prevented from decreasing due to the aging of the sealing member 5 so that the lip seal does not rotate with the rotation of the rotary shaft 2.

Since the lip seal 6 is pinch-held by the spacer 7 and the left-hand end of the inner axial portion 4a of the case 4, the firmly pinch-held position of the lip seal can be located nearest the rotary shaft 2 or, to be specific, at the innermost edge of the spacer. For that reason, the curved portion of the lip seal is prevented from becoming deformed and from displacing the sealing surface of the lip seal on the rotary shaft 2 in the axial direction thereof. In addition, the sealing surface will not experience premature wear resulting in a shortened life of the lip seal as contrasted to lip seal device wherein a lip seal is pinch-held outside the middle portion of a spacer with regard to the radial direction of the lip seal device.

Since the thickness of the sealing member 5 at the left-hand end (as to FIG. 4) of the inner axial portion 4a of the case 4 is as small as 0.1 to 0.5 mm, the pinch-holding force on the lip seal does not substantially decrease even if the sealing member ages. Besides, the small-thickness portion of the sealing member 5 prevents the lip seal 6 from being damaged by the left-hand end of the inner axial portion 4a made of a metal. The portion of the sealing member 5, which covers the outside circumferential surface of the outer axial portion 4c of the case 4, is provided with a plurality of annular projections 5d located at prescribed intervals and each extending continuously in the circumferential direction of the lip seal device 3. The annular projections 5d are press-fitted on the inside circumferential surface of the housing 1 to keep the sealing member 5 and the housing liquid-tight to each other.

The inner circumferential portion of the lip seal 6 is curved toward the sealed fluid or leftward (as to FIG. 4), and the right-hand side of the bent inner circumferential portion is put in elastic contact with the outside circumferential surface of the rotary shaft 2 by the elasticity of the lip seal 6 so that the sealed fluid present on the left-hand side of the lip seal is prevented from leaking to the atmosphere present on the right-hand side of the lip seal. The sealing surface of the lip seal 6 on the rotary shaft 2 is provided with an annular groove extending continuously in the circumferential direction of the rotary shaft. Therefore, the sealing surface consists of a first sealing surface 10a, between the annular groove and the sealed fluid, and a second sealing surface 10b, between the annular groove and the atmosphere. The first sealing surface 10a is made smoother than the second sealing surface 10b.

The cross section of the annular groove is shaped as a semicircle slightly deformed toward the sealed surface, as shown in FIG. 5. The corner of the joint 9a of the annular groove and the first sealing surface 10a is made nearly rectangular so that the corner is as sharp as possible. The joint 9b of the annular groove 9 and the second sealing surface 10b is shaped as a smooth curved surface.

Since the sealing surface of the lip seal 6 is provided with the annular groove the thickness of the portion of the lip seal at the annular groove is reduced to make the portion easier to deform by the pressure of the sealed fluid. As a result, the joints 9a and 9b of the annular groove 9 have higher pressure contact with the outside circumferential surface of the rotary shaft 2. Therefore, the contact portion of joints 9a and 9b on the outside circumferential surface of the rotary shaft are in the shape of a line and belt, respectively, extending continuously in the circumferential direction of the rotary shaft. The two annular contact portions are thus obtained by providing the single annular groove, to produce a double sealing effect.

When the rotary shaft 2 is rotated, the first sealing surface 10a tends to slightly separate outwardly from the outside circumferential surface of the rotary shaft. If the joint 9a were shaped as a smooth curved surface, the line of contact between the contact portion of joint 9a and the rotary shaft extending circumferentially therearound would likely fluctuate in the axial direction of the rotary shaft. Thus, the line of contact would tend to resemble a "warped" circle, rather than a "pure" circle. For that reason, the contact portion would be likely to become discontinuous in the circumferential direction of the rotary shaft resulting in excess leakage.

However, according to the subject invention joint 9a is as sharp as possible and in contact with the outside circumferential surface of the rotary shaft 2. Therefore, the position of the circumferential contact portion is less likely to fluctuate along the axial length of the shaft. Thus, the contact portion of the joint 9a maintains a continuous line of contact along the circumference of the rotary shaft 2 to suppress the leaking of the sealed fluid.

The joint 9b is located outside the other joint 9a with regard to the axial direction of the rotary shaft 2, and the continuous circumferential contact portion of the joint 9b can be maintained better than that of the other joint 9a. If the corner of the joint 9b were sharp, it would be desirable from a viewpoint of preventing leakage. However, the sealed fluid could not be expected to perform lubrication. For that reason, the life of the joint 9b would be shortened. According to the subject invention, since the joint 9b is shaped as a smooth curved surface, the sealed fluid is introduced as a lubricant to the second sealing surface 10b to lubricate it well.

Since the first sealing surface 10a is made smoother than the second sealing surface 10b, the first sealing surface conforms with the outside circumferential surface of the rotary shaft 2 better than the second sealing surface before the rotary shaft is initially rotated after the installation of the lip seal device 3 in the housing 1. Therefore, the first sealing surface of higher smoothness performs a sure sealing action.

When the rotary shaft 2 is rotated for the first time after the installation of the lip seal device 3 in the housing 1, the less smooth second sealing surface 10b quickly conforms to the outside circumferential surface of the rotary shaft due to the initial wear of the second sealing surface thereon. Subsequently, the second sealing surface 10b is in greater conformity with the outside circumferential surface of the rotary shaft than the first sealing surface 10a when the formation of the rotary shaft is stopped. The first sealing surface 10a of higher smoothness undergoes little initial wear due to the rotation of the rotary shaft 2 and therefore persistently tends to maintain the initial state thereof and does not readily conform to the outside circumferential surface of the rotary shaft.

Therefore, the second sealing surface 10b seals more effectively than the first sealing surface after the rotary shaft has been rotating for a period of time. In contrast, the first sealing surface 10a provides good sealing action during the initial stag when the second sealing surface is relatively rough.

FIG. 6 shows a lip seal device 13 which is still another embodiment and has a first lip seal 16A and a second lip seal 16B. The inner circumferential portions of the first and the second lip seals 16A and 16B are curved toward a sealed fluid and in sliding contact with the outside circumferential surface of a rotary shaft 12. The first lip seal 16A located at the side of the sealed fluid is provided with an annular groove 19 of substantially the same constitution as the preceding embodiments. A first sealing surface 20a is provided at the left-hand side (as to FIG. 6) of the annular groove 19 and a second sealing surface 20b is provided at the right-hand side of the annular groove.

A cylindrical case 14 surrounding the first and the second lip seals 16A and 16B at the outer circumferential portions thereof has a large-diameter portion 14a, a small-diameter portion 14b and a wall 14c located therebetween. The left-hand end (as to FIG. 6) of the case 14 is bent outwardly in the radial direction of the lip seal device 13 so that an annular groove 25 is defined on the outside circumferential surface of the case. A sealing member 26 is fitted in the annular groove 25 to seal the boundary between the case 14 and a housing 11. The right-hand end (as to FIG. 6) of the large-diameter portion 14a is bent inwardly in the radial direction of the lip seal device 13 so that a crimped portion 14d is formed. Between the wall 14c and the crimped portion 14d, a plate 27, the first lip seal 16A, a sealing member 29 embedded with a rigid plate 28 such as a metal washer, the second lip seal 16B and a plate 30 are pinch-held together in that order from the wall.

The plate 27 is made of a metal so that the outside diameter thereof is smaller by a prescribed quantity than the inside diameter of the large-diameter portion 14a of the case 14. A projection 16Aa provided on the outer circumferential portion of the first lip seal 16A and extending toward the sealed fluid is engaged on the outside circumferential surface of the plate 27 to prevent the first lip seal from coming off. The outer circumferential portion of the first lip seal 16A is provided with an annular notch 16Ab opposite the projection 16Aa, so that the annular notch absorbs the elastic deformation of the rubber-made sealing member 29 when the sealing member is fitted in the case 14.

The inside circumferential surface of the sealing member 29 is a curved surface 29a extending along the sealed-fluid-side curved surface of the second lip seal 16B so as to prevent the inner circumferential portion of the second lip seal from being displaced leftward (as to FIG. 6) in the axial direction of the lip seal device 13 more than a necessary quantity. This keeps the inner circumferential portion of the second lip seal from being overlapped with the first lip seal 16A more than a necessary quantity.

The plate 30 located at the right-hand end (as to FIG. 6) of the case 14 is made of metal and shaped as a simple washer. The gap t' between the inside circumferential surface of the plate and the outside circumferential surface of the rotary shaft 12 is set to be small as to prevent the inner circumferential portion of the second lip seal 16B from accidentally being bent back rightwardly (as to FIG. 6).

It will be easily understood that the annular groove 19 of the first lip seal 16A produces the same effect as those in the preceding embodiments.

Figure 7:
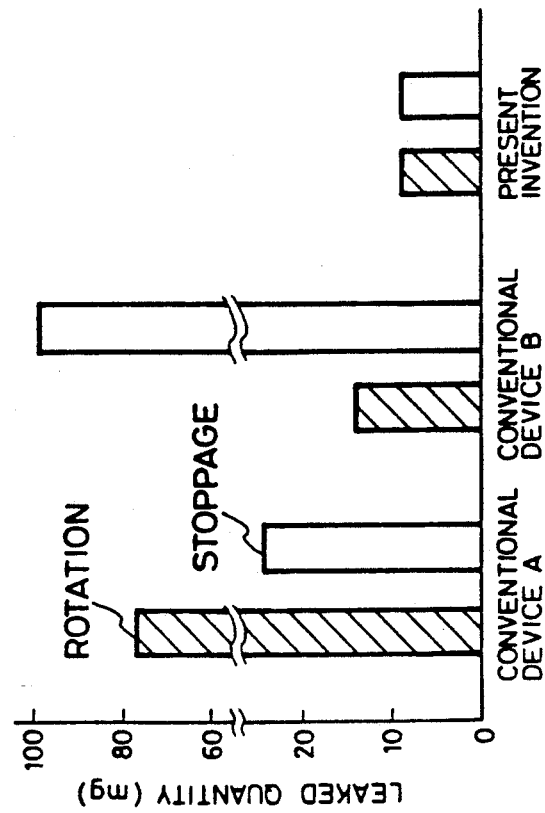
FIG. 7 shows a graph indicating the results of a test in which the leaked quantity of a sealed fluid was measured as to the lip seal device shown in FIG. 4, and conventional lip seal devices.

The effect of the present invention is now described with reference to FIG. 7 showing the results of a test on the lip seal device 3 shown in FIG. 4, and conventional lip seal devices A and B for comparison. The conventional lip seal device A was the same as the lip seal device 3 of FIG. 4 except that the sealing surface of a lip seal 6 had no annular groove. The other conventional lip seal device B was the same as the lip seal device 3 of FIG. 4 except that the sealing surface of the lip seal 6 had no annular groove but had a spiral groove extending in such a direction that a sealed fluid having leaked to the sealing surface was returned by the rotation of a rotary shaft 2. In the test, each of the lip seal devices 3, A and B was installed in a compressor of the swash plate type, and the leaked quantity of the sealed fluid was measured. After the rotary shaft of the compressor had been continuously rotated at the rate of 4,500 rpm for 24 hours with the inlet pressure and outlet pressure of the compressor set at 1.5 to 2.5 kg/cm$^2$ and 13 to 18 kg/cm$^2$, respectively, the rotary shaft was continuously stopped for 24 hours. The cycle of such rotation and stoppage was repeated four times, at each of which the total leaked quantity of the sealed fluid during the rotation and stoppage were measured. As shown in FIG. 7, the leaked quantity of the sealed fluid as to the lip seal device 3 of FIG. was smaller than that of the sealed fluid as to the conventional lip seal devices A and B, both during the rotation and during the stoppage. Therefore, the lip seal device 3 had better sealing performance than the conventional lip seal devices A and B.

Further, the sealing performance of the lip seal devices which were the above-described embodiments of the present invention was measured in the same test where the thickness of each of the lip seals 6 and 16A of the devices was set at 1 mm and the distance between the inner edge of each lip seal and each of the annular grooves 9 and 19 was changed in a range from 0.3 mm to 1.1 mm. The sealing performance tended to improve as the distance was increased. The same measurement was performed with regard to the width D of each of the annular grooves and 19 as the width was changed in a range from 0.2 mm to 1.2 mm. The sealing performance tended to improve as the width D was increased.

FIG. 8 shows a lip seal device which is still another embodiment. A first lip seal 3 and a second lip seal 4 are made of the same material such as a material obtained by adding 15% of graphite by weight to polytetrafluoroethylene, and the inside diameter $D_2$ of the second lip seal is made larger than that $D_1$ of the first lip seal in a free state before the lip seals are put in actual use, so that the contact force of the second lip seal on a rotary shaft 5 is weaker than that of the first lip seal on the rotary shaft. A sealed fluid is sealed by the first lip seal 3 and a sealing member 16. Since the inner circumferential portion of the first lip seal 3 is in contact with a rotary shaft 5 by the sufficient contact force, the sealed fluid is prevented from leaking along the boundary between the first lip seal and the rotary shaft. A very small quantity of the sealed fluid having leaked between the first lip seal 3 and the sealing member 16 is sealed by the second lip seal 4. Although the second lip seal 4 is in contact With the rotary shaft 5 by the weaker contact force than the first lip seal 3, the second lip seal prevents the very small quantity of the sealed fluid from leaking along the second lip seal because the pressure of the sealed fluid having leaked along the first lip seal is low.

Since the contact force of the second lip seal 4 on the rotary shaft 5 is set to be weaker than that of the first lip seal 3 on the rotary shaft as mentioned above the sliding contact resistance of the second lip seal to the rotation of the rotary shaft is lower than that in a conventional device although the sealing performance of the second lip seal is sufficient. Further, the life of the second lip seal 4 is increased because of the weaker contact force thereof on the rotary shaft 5.

In this embodiment, the inside diameter $D_2$ of the second lip seal 4 is made larger than $D_1$ of the first lip seal 3 in the free state before being put in actual use, so that the contact force of the second lip seal on the rotary shaft 5 is weaker than that of the first lip seal on the rotary shaft. However, the present invention is not confined thereto but may be otherwise embodied so as to make the second lip seal of a more flexible material than the first lip seal to render the contact force of the second lip seal on the rotary shaft 5 weaker than that of the first lip seal on the rotary shaft. For example, the first lip seal 3 may be made of a material obtained by adding 15% of graphite by weight to polytetrafluoroethylene, and the second lip seal 4 may be made of a material obtained by adding 5 to 10% of graphite by weight to polytetrafluoroethylene, to render the second lip seal more flexible than the first lip seal.

What is claimed is:

1. A lip seal device for sealing a gap between a housing and a rotary shaft, comprising:
   a case surrounding said rotary shaft;
   a first lip seal having an outer circumferential portion for attachment to said case, and an inner circumferential portion for sealing contact with said rotary shaft, said first lip seal being attached inside said case;
   support means for holding said first lip seal on at least the first lip seal's outer circumferential portion, the inner circumferential portion of said first lip seal being curved toward a sealed fluid, wherein said first lip seal comprises a first sealing surface in sliding contact with an outside circumferential surface of said rotary shaft; and
   a second lip seal having an outer circumferential portion for attachment to said case, and an inner circumferential portion for sealing contact with said rotary shaft, said second lip seal being located further from said sealed fluid than said first lip seal, the inner circumferential portion of said second lip seal being curved toward said sealed fluid and having a second sealing surface in sliding contact with the outside circumferential surface of said rotary shaft, wherein said second lip seal is located so that a curved portion of the inner circumferential surface of said first lip seal at the side opposite to the side of said sealed fluid is in contact with an inner circumferential edge of said second lip seal to prevent said first sealing portion from moving in the axial direction thereof, wherein said first sealing surface of said first lip seal includes seal lubricating means for allowing predetermined leakage to provide sufficient lubrication to sealing portions of said first lip seal, said seal lubricating means comprising an annular groove in said first lip seal are extending continuously in a circumferential direction of said rotary shaft so that said first sealing surface of said first lip seal has a first sealing portion in front of said annular groove and a second sealing portion in the rear of said annular groove, the contact pressure of said first sealing portion on said rotary shaft being lower than that of said second sealing portion on said rotary shaft to allow said leakage.

2. A lip seal device for sealing a gap between a housing and a rotary shaft, comprising:
   a case surrounding said rotary shaft;
   a first lip seal having an outer circumferential portion for attachment to said case, and an inner circumferential portion for sealing contact with said rotary shaft, said first lip seal being attached inside said case;
   support means for holding said first lip seal on at least the first lip seal's outer circumferential portion, the inner circumferential portion of said first lip seal being curved toward a sealed fluid, wherein said first lip seal comprises a first sealing surface in sliding contact with an outside circumferential surface of said rotary shaft; and a second lip seal having an outer circumferential portion for attachment to said case, and an inner circumferential portion for sealing contact with said rotary shaft, said second lip seal being located further from said sealed fluid than said first lip seal, the inner circumferential portion of said second lip seal being curved toward said sealed fluid and having a second sealing surface in sliding contact with the outside circumferential surface of said rotary shaft, wherein said second lip seal is located so that a curved portion of the inner circumferential surface of said first lip seal at the side opposite to the side of said sealed fluid is in contact with an inner circumferential edge of said second lip seal to prevent said first sealing portion from moving in the axial direction thereof, wherein said first sealing surface of said first lip seal has an annular groove extending continuously in a circumferential direction of said rotary shaft so that said first sealing surface of said first lip seal has a first sealing portion in front of said annular groove and a second sealing portion in the rear of said annular groove, the contact pressure of said first sealing portion on said rotary shaft being lower than that of said second sealing portion on said rotary shaft.

wherein the roughness of said first sealing portion of said first sealing surface is lower than that of said second sealing portion thereof.

3. A lip seal device according to claim 1, wherein the length of said first sealing surface B in the axial direction thereof is smaller for said first sealing portion than said second sealing portion.

4. A lip seal device according to claim 1, wherein the cross section of said annular groove is shaped nearly as a semicircle.

5. A lip seal device according to claim 1, wherein a part of the cross-sectional outline of said annular groove which rises from said first sealing portion of said first sealing surface forms a sharper edge with the surface of said shaft, and a second part of said cross-sectional outline which rises from said second sealing portion of said first sealing surface forms a smooth interface with the surface of said shaft.

6. A lip seal device according to claim 1, wherein the peak of said contact pressure of said second sealing portion on said rotary shaft is near said annular groove.

7. The lip seal device, according to claim 1, wherein said sealing surface of said second lip seal constitutes a third sealing portion.

8. A lip seal device according to claim 7, wherein the contact pressure of said first sealing portion on said rotary shaft is set to be lower than that of said second sealing portion on said rotary shaft, and wherein the contact pressure of said third sealing portion on said rotary shaft is set to be lower than that of said first sealing portion on said rotary shaft.

9. A lip seal device according to claim 7, wherein the length of said first sealing portion is smaller than the length of said third sealing portion, and the length of said third sealing portion is smaller than the length of said second sealing portion in the axial direction of said first sealing surface.

* * * * *